United States Patent [19]

Hama et al.

[11] Patent Number: 5,238,387

[45] Date of Patent: Aug. 24, 1993

[54] APPARATUS FOR MOLDING A PRODUCT OF SYNTHETIC RESIN

[75] Inventors: Nozumu Hama; Takaaki Sato; Akihiko Koshiro; Masao Tegawa; Tomio Iino; Seiji Yanagisawa; Nobuo Kikuchi; Kazuo Migishima; Kazumi Ishida, all of Sayama, Japan

[73] Assignee: Honda Giken Kogyo Kabushiki Kaisha, Tokyo, Japan

[21] Appl. No.: 825,292

[22] Filed: Jan. 24, 1992

Related U.S. Application Data

[62] Division of Ser. No. 709,156, Jun. 3, 1991, abandoned, and Ser. No. 446,450, Dec. 5, 1989, Pat. No. 5,044,919.

[30] Foreign Application Priority Data

Dec. 9, 1988 [JP] Japan .................. 63-160239
Jan. 25, 1989 [JP] Japan .................... 1-15881
Feb. 1, 1989 [JP] Japan .................... 1-11681

[51] Int. Cl.⁵ .................. B29C 51/10; B29C 51/20
[52] U.S. Cl. .................... 425/388; 425/441; 425/442; 425/451.9; 425/DIG. 119; 249/161; 249/172
[58] Field of Search .............. 425/117, 125, 127, 589, 425/388, 441, 442, 443, 451.9, DIG. 10, 85, DIG. 119, DIG. 58, 577; 249/161, 113, 171, 172, 162, 56, 63, 64, 83, 176, 178, 97, 177; 264/46.8

[56] References Cited

U.S. PATENT DOCUMENTS

| | | | |
|---|---|---|---|
| 3,261,897 | 7/1961 | Munk | 425/DIG. 58 |
| 3,298,656 | 1/1967 | Zastrow | 249/172 |
| 3,433,292 | 3/1969 | McDonald | 425/577 |
| 3,728,098 | 4/1973 | Giffen | 425/388 |
| 3,824,062 | 7/1974 | Farrell | 425/451 |
| 3,981,671 | 9/1976 | Edwards | 425/453 |
| 4,008,990 | 2/1977 | Hiemer et al. | 425/454 |
| 4,154,566 | 5/1979 | Ward | 425/451.3 |
| 4,191,523 | 3/1980 | Niederst et al. | 425/454 |
| 4,420,297 | 12/1983 | Remon | 425/577 |
| 4,452,420 | 6/1984 | Lundquist | 425/577 |
| 4,535,574 | 8/1985 | Dettelbach et al. | 264/46.4 |
| 4,573,902 | 3/1986 | Heilman et al. | 425/589 |
| 4,687,434 | 8/1987 | Beglinger | 425/577 |
| 4,708,625 | 11/1987 | Arend | 425/589 |
| 4,793,784 | 12/1988 | Belleville et al. | 425/817 R |
| 4,836,495 | 6/1989 | McCormack | 249/177 |
| 4,840,557 | 6/1989 | Ishimoto et al. | 425/577 |
| 4,927,347 | 5/1990 | Golata et al. | 249/161 |
| 4,929,166 | 5/1990 | DiSimone et al. | 425/589 |
| 5,007,815 | 4/1991 | Shoji | 425/117 |
| 5,037,289 | 8/1991 | Ohta et al. | 425/442 |
| 5,047,184 | 9/1991 | Busch et al. | 464/46.8 |
| 5,053,182 | 10/1991 | Hedgewick | 249/63 |

FOREIGN PATENT DOCUMENTS

| | | | |
|---|---|---|---|
| 58-38417 | 3/1983 | Japan . | |
| 59-229325 | 12/1984 | Japan . | |
| 60-918 | 1/1985 | Japan | 425/577 |
| 60-13619 | 1/1985 | Japan . | |
| 62-225316 | 10/1987 | Japan | 425/577 |
| 175959 | 12/1922 | United Kingdom . | |
| 356664 | 3/1930 | United Kingdom . | |
| 393988 | 6/1933 | United Kingdom . | |
| 448535 | 6/1936 | United Kingdom | 249/63 |
| 502256 | 3/1939 | United Kingdom . | |
| 813483 | 5/1959 | United Kingdom . | |
| 815422 | 6/1959 | United Kingdom . | |
| 864179 | 3/1961 | United Kingdom . | |
| 1039049 | 8/1966 | United Kingdom . | |
| 1220492 | 1/1971 | United Kingdom . | |
| 1310297 | 3/1973 | United Kingdom . | |
| 1568882 | 6/1980 | United Kingdom . | |
| 1585381 | 3/1981 | United Kingdom . | |
| 2190621 | 11/1987 | United Kingdom . | |
| 2213763 | 8/1989 | United Kingdom . | |
| 2225978 | 6/1990 | United Kingdom . | |

*Primary Examiner*—Khanh P. Nguyen

[57] ABSTRACT

An apparatus for molding a product of synthetic resin which includes a mold assembly having a die plate and first and second mold dies which define a mold cavity therebetween. The first mold die includes a fixed member fixed to the die plate. At least two movable members are respectively displaceable in perpendicular directions away from each other. Each of the movable members are mounted on the die plate and are further displaced from the fixed member to open the first mold die. A resilient member is provided for perpendicular contacting the movable members and urging the movable members toward the fixed member to assembly the first mold die together.

3 Claims, 11 Drawing Sheets

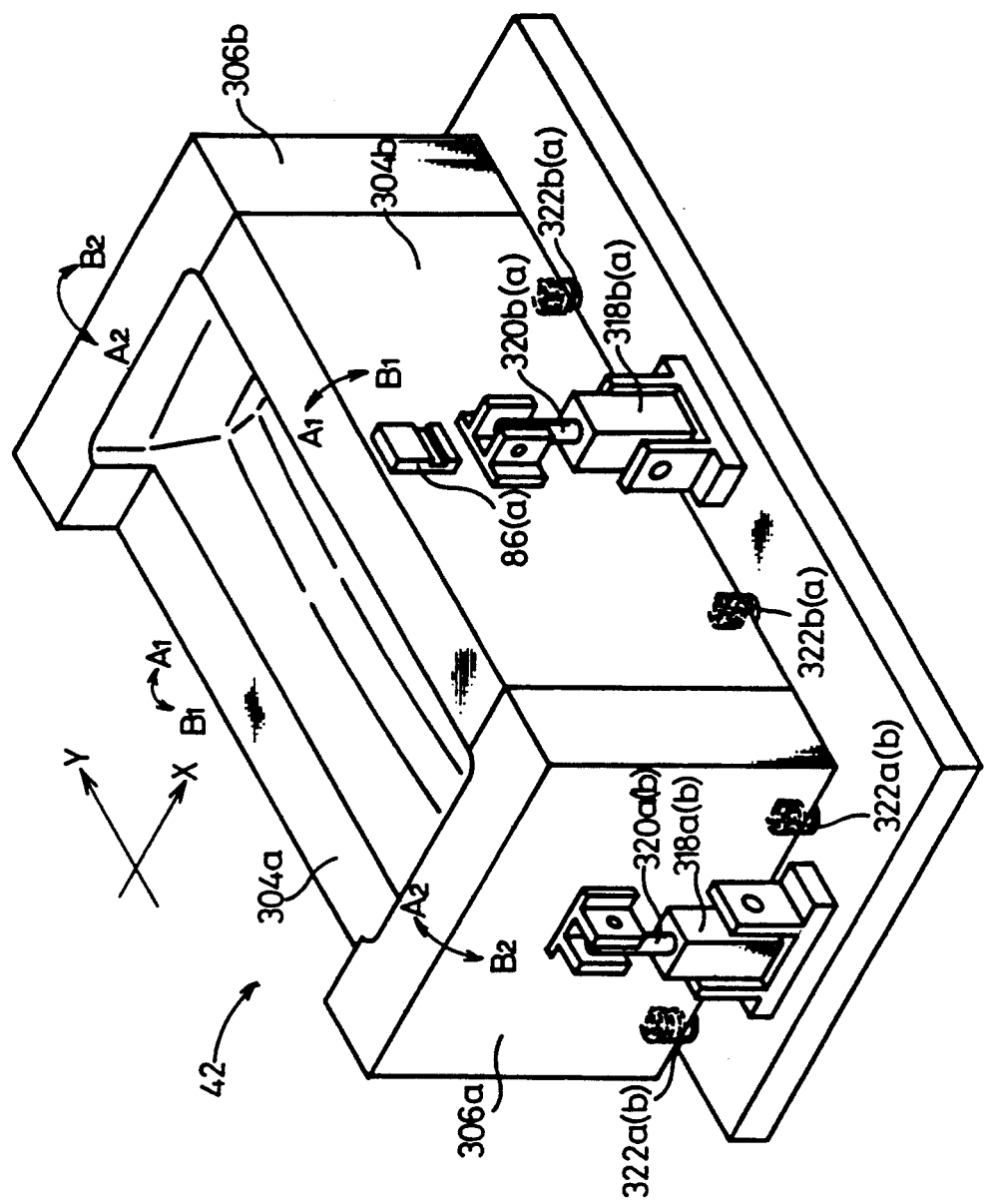

APPARATUS FOR MOLDING A PRODUCT OF SYNTHETIC RESIN

This application is a divisional of application Ser. No. 07/709,156, filed on Jun. 3, 1991, now abandoned and Ser. No. 07/446,450, filed on Dec. 5, 1989, now U.S. Pat. No. 5,044,919, issued on Sep. 3, 1991.

BACKGROUND OF THE INVENTION

The present invention relates to a synthetic resin molding apparatus for efficiently manufacturing products molded of synthetic resin.

Generally, a process of pouring a resin solution into a molding assembly to produce a synthetic resin molding comprises, for example, the steps of setting a covering sheet in a mold assembly composed of male and female mold dies, closing the mold assembly by moving the male and female mold dies relatively toward each other, pouring a resin solution into the mold assembly, and opening the mold assembly in order to remove the molded product.

After the resin solution has been poured into the mold assembly, it takes a few minutes for the poured resin solution to be hardened. This time interval is lost time in the entire molding process. Attempts have been made to increase the rate of production by interconnecting molding stations for effecting the molding steps with conveyors and delivering a number of mold assemblies on the conveyors so that the molding steps can successively be carried out.

Products molded of synthetic resin include large-size moldings such as automotive instrument panels. Mold assemblies for molding such large-size products are expensive, and the number of such mold assemblies used is limited so as to lower the cost of molded articles. According to one proposal, two mold assemblies are employed, and these mold assemblies are alternately shuttled for molding operation (see Japanese Laid-Open Patent Publication No. 59(1984)-229325). However, the proposed system has a limitation on the reduction of the cycle time.

An effort to shorten the time required to carry out various operations associated with the opening and closing of the mold assembly is also one of the important factors necessary to increase the efficiency of molding production. When an automotive instrument panel, in particular, is to be molded, an attachment and a duct have to be assembled in the male mold die in order to fabricate an instrument panel region where meters are to be housed, and a covering sheet having an embossed pattern on its surface has to be set in the female mold die, before the mold assembly is closed. Since the mating surfaces, i.e., the product forming surfaces, of the male and female mold dies face each other, however, the above-mentioned components cannot easily be set in the mold dies, and hence the production efficiency will not be increased substantially.

Japanese Laid-Open Patent Publication No. 58-38417 discloses swingable die holders to which upper and lower mold dies are fixed. With the disclosed arrangement, however, the upper and lower mold dies supported on the die holders cannot be tilted through sufficient angles to allow easy setting of necessary components. Furthermore, the ease with which the components are set is not increased substantially as the upper and lower mold dies are tilted in the same direction.

Some molded products such as instrument panels have undercuts. To mold such an article, a slide core is employed to give an undercut configuration to the molding. If an undercut were to be formed by a mold die, it would become difficult to remove the molded product from the mold assembly depending on the depth of the undercut formed.

Where a mold die having a slide core is moved to mold a product of synthetic resin, a problem is posed by various tubes and hoses such as hydraulic hoses connected to a cylinder which moves the slide core back and forth and tubes connected to the mold die for supplying and discharging cooling water. These tubes and hoses make up a complex system and cannot be serviced well since they are connected in such a manner to allow the mold die to move unobstructedly. To avoid such a drawback, the tubing on a station is connected to the tubing on the mold die through tube couplings, and these tubings are disconnected from each other when the mold die is moved.

The tube couplings for connecting the tubings are mostly in the form of quick-connect-and-disconnect couplings of the self-sealing type which include check valves. If a product is molded of a resin foam or cellular plastic, when the tubings are disconnected under a gas pressure developed by the foaming of the resin material, the pressure in the cylinder for moving the slide core is lowered to retract the slide core from its original position. As a result, the undercut formed in the product is shaped with poor accuracy. If a covering sheet and a resin sheet are to be integrally joined, the covering sheet tends to be wrinkled, and the resulting product becomes defective.

Some mold assemblies for molding resin products such as instrument panels include a female mold die composed of a number of separate members that are separable from each other to allow a molded product to be removed easily (see Japanese Utility Model Registration Publication No. 60-13619, for example). If a unitary inseparable female mold die were used, the female mold die would be held in too intimate contact with the product which is complex in shape, and it would be time-consuming to remove the molded product from the female mold die.

The separable mold die has its own shortcoming when the mold assembly is closed. More specifically, when the separable female mold die is put together and the male mold die and the female mold die are combined to close the mold assembly, a mechanism for separating and combining the female mold die may fail to operate, or the female mold die may not fully be put together due to an error on the part of the operator. Upon such a failure, the male mold die does not mate with the female mold die smoothly, and the mold assembly may be damaged or broken.

To set a covering sheet in the separable female mold die, the covering sheet is sometimes attracted under vacuum to the female mold die so that the covering sheet is intimately held against the product forming surface of the female mold die. To the separable members of the female mold die, there are connected pipes of an evacuating circuit for attracting the covering sheet under vacuum to the female mold die. Unless these pipes are carefully arranged with respect to the female mold die, they are liable to crack, leaking the air pressure, because the separable female die members are repeatedly separated and put together. Inasmuch as the pipes are connected respectively to the separable female mold die members, the number of parts used in the mold assembly is large.

SUMMARY OF THE INVENTION

It is a major object of the present invention to provide a synthetic resin molding apparatus which can shorten a cycle time of molding operation, can be operated with ease, and can effect the steps of molding a product highly efficiently.

Another object of the present invention is to provide an apparatus for molding a product of synthetic resin, comprising a first station including a mechanism for opening and closing a mold assembly, a second station including a mechanism for pouring a resin solution into the mold assembly which is closed, a third station for hardening the poured resin solution in the mold assembly, and a feed mechanism interconnecting the first, second, and third stations in a looped configuration, for circulating at least three mold assemblies through the first, second, and third stations.

Still another object of the present invention is to provide the apparatus wherein the mechanism of the first station comprises a base, a tilt table angularly movably supported on the base by a support shaft, a vertically movable ram, and a holder frame angularly movably supported on the vertically movable ram by a support shaft, each of the mold assemblies comprising a first mold die supportable on the tilt table and a second mold die holdable by the holder frame.

Yet another object of the present invention is to provide the apparatus wherein the holder frame and the tilt table are swingable in opposite directions, respectively, into working positions.

Yet still another object of the present invention is to provide the apparatus wherein the mechanism of the first station further includes a pinion gear mounted on the support shaft by which the holder frame is supported, a drive source mounted on the vertically movable ram, and a rack coupled to the drive source and held in mesh with the pinion gear, whereby the holder frame with the second mold die held thereby can be angularly moved in response to linear displacement of the rack caused by the drive source through the pinion gear.

A further object of the present invention is to provide the apparatus wherein the holder frame is angularly movable through at least 90° with respect to a horizontal plane.

A still further object of the present invention is to provide the apparatus wherein the feed mechanism comprises a carriage for feeding each of the mold assemblies from the first station to the second station, the first mold die being supportable on the tilt table through the carriage, the mechanism of the first station further including a cylinder for angularly moving the tilt table through at least 30° with respect to a horizontal plane.

A yet further object of the present invention is to provide the apparatus further including a fourth station for hardening the poured resin solution in the mold assembly.

A still further object of the present invention is to provide the apparatus wherein the feed mechanism comprises self-propelled tractor means for moving the mold assemblies between the second station and the third station and between the third station and the first station.

It is also an object of the present invention to provide an apparatus for molding a product of synthetic resin, comprising a mold assembly having a first mold die for placing therein a covering sheet of a predetermined shape, a second mold die combinable with the first mold die to define a mold cavity therebetween, and means for pouring a resin foam solution into the mold cavity to form a molding integral with the covering sheet, the first mold die having a plurality of slide cores, each of the slide cores comprising a core member for adding an undercut shape to the molding, a stop for limiting displacement of the core member toward the mold cavity, an actuator for displacing the core member away from the mold cavity, and a resilient member for resiliently urging the core member toward the mold cavity.

Another object of the present invention is to provide the apparatus wherein the actuator comprises a cylinder having a piston rod, the resilient member comprising a coil spring disposed around the piston rod, the coil spring having an end engaging the stop for normally urging the core member toward the mold cavity.

Still another object of the present invention is to provide an apparatus for molding a product of synthetic resin, comprising a mold assembly having a die plate, first and second mold dies which define a mold cavity therebetween, the first mold die being mounted on the die plate, the first mold die comprising a fixed member fixed to the die plate, at least one movable member mounted on the die plate and displaceable away from the fixed member, and a resilient member for normally urging the movable member toward the fixed member to put the first mold die together.

Yet another object of the present invention is to provide the apparatus wherein the first mold die includes at least two movable members which are displaceable away from the fixed member in respective directions which are perpendicular to each other.

Still another object of the present invention is to provide the apparatus wherein the first mold die has a product forming surface facing the mold cavity and composed of a porous material and/or suction holes, the fixed member having a cavity defined therein, the movable member having a cavity defined therein and communicating with the cavity in the fixed member through a vent hole, further including a vacuum pump communicating with the cavity in the fixed member, whereby the vacuum pump and the cavities in the fixed and movable members jointly provide an evacuating circuit for evacuating the mod cavity.

A still further object of the present invention is to provide the apparatus wherein the first mold die includes a seal member interposed between confronting surfaces of the fixed and movable members.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 11 is a perspective view of a first mold die of the mold assembly shown in FIG. 10.

DETAILED DESCRIPTION OF THE PREFERRED EMBODIMENTS

Figure 1:
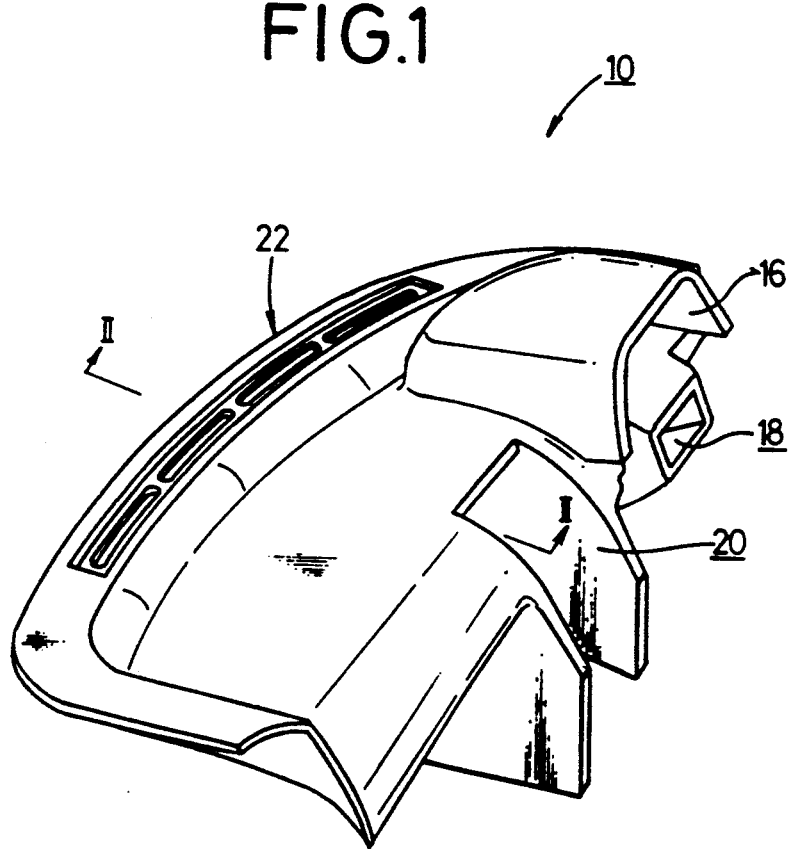
FIG. 1 is a perspective view of an automotive instrument panel to be molded by a synthetic resin molding apparatus according to the present invention.
Figure 2:
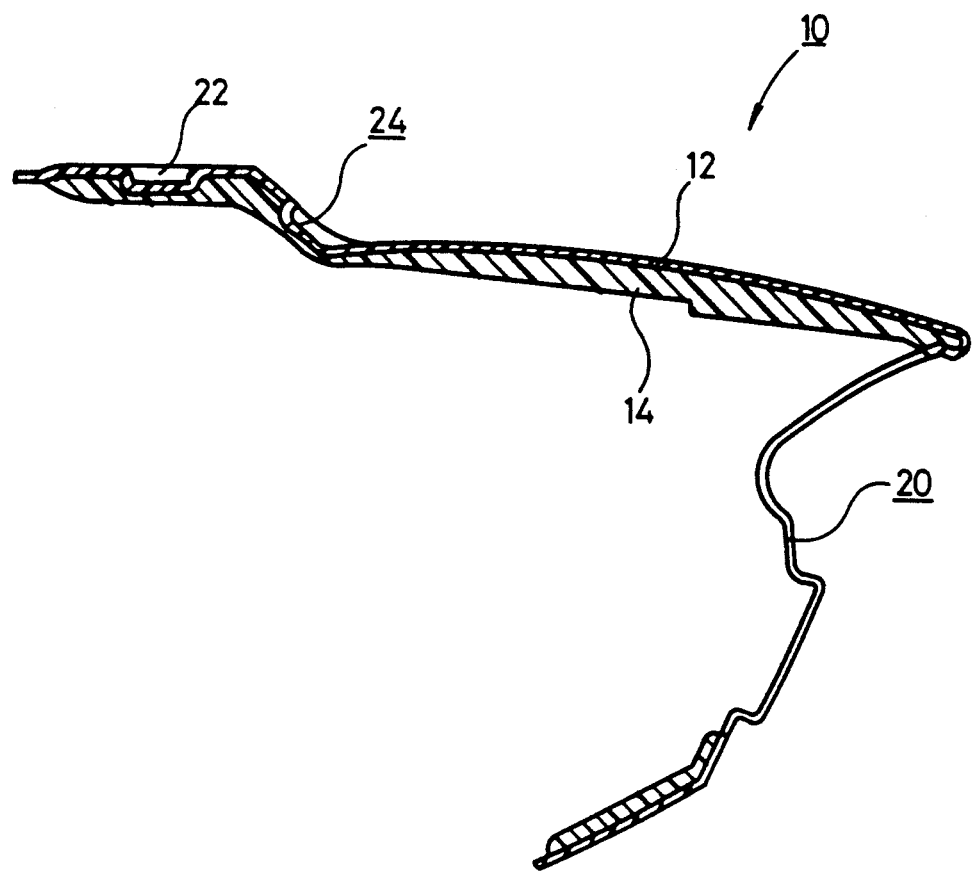
FIG. 2 is an enlarged cross-sectional view taken along line II—II of FIG. 1.

FIGS. 1 and 2 show an automobile instrument panel which is one example of a synthetic resin molding produced by a synthetic resin molding apparatus according to the present invention.

As shown in FIG. 2, the instrument panel, generally denoted at 10, is in the form of an integral unitary structure comprising a covering sheet 12 made of synthetic leather of vinyl chloride or the like and a core 14 made of a resin foam or cellular plastic such as hard urethane, the core 14 being attached to an inner surface of the covering sheet 12. As shown in FIG. 1, the instrument panel 10 includes various voids or spaces such as an instrument region 16 in which various meters will be housed, a steering column region 18 through which a steering column will be inserted, and a box region 20 for housing an air-conditioning unit or an audio unit therein. The instrument panel 10 also has a defroster region 22 in which to define a plurality of slots for ejecting hot air from a heater that is installed in a completed automobile. The instrument panel 10 has undercuts 24 near the defroster region 22.

Figure 3:
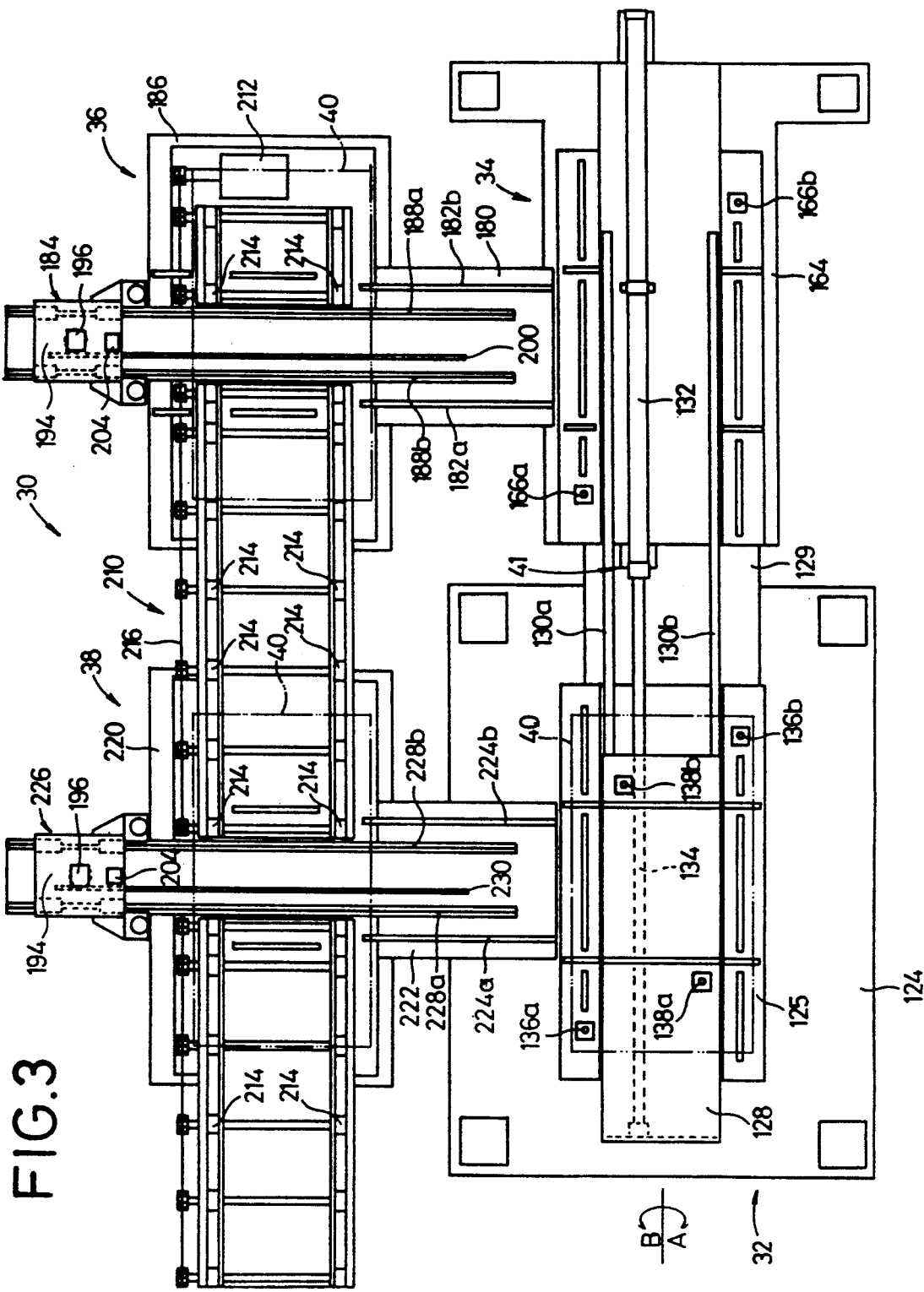
FIG. 3 is a plan view showing various stations of the synthetic resin molding apparatus.

FIG. 3 shows various stations of a synthetic resin molding apparatus 30 according to the present invention. The stations include a first station 32, a second station 34, a third station 36, and a fourth station 38. The synthetic resin molding apparatus 30 has at least three mold assemblies 40 which can successively be fed through the first, second, third, and fourth stations 32, 34, 36, 38 that are interconnected in a looped configuration by a feed mechanism 41. While the mold assemblies 40 are being positioned in these stations 32, 34, 36, 38, various operations are effected on the mold assemblies 40.

Figure 4:
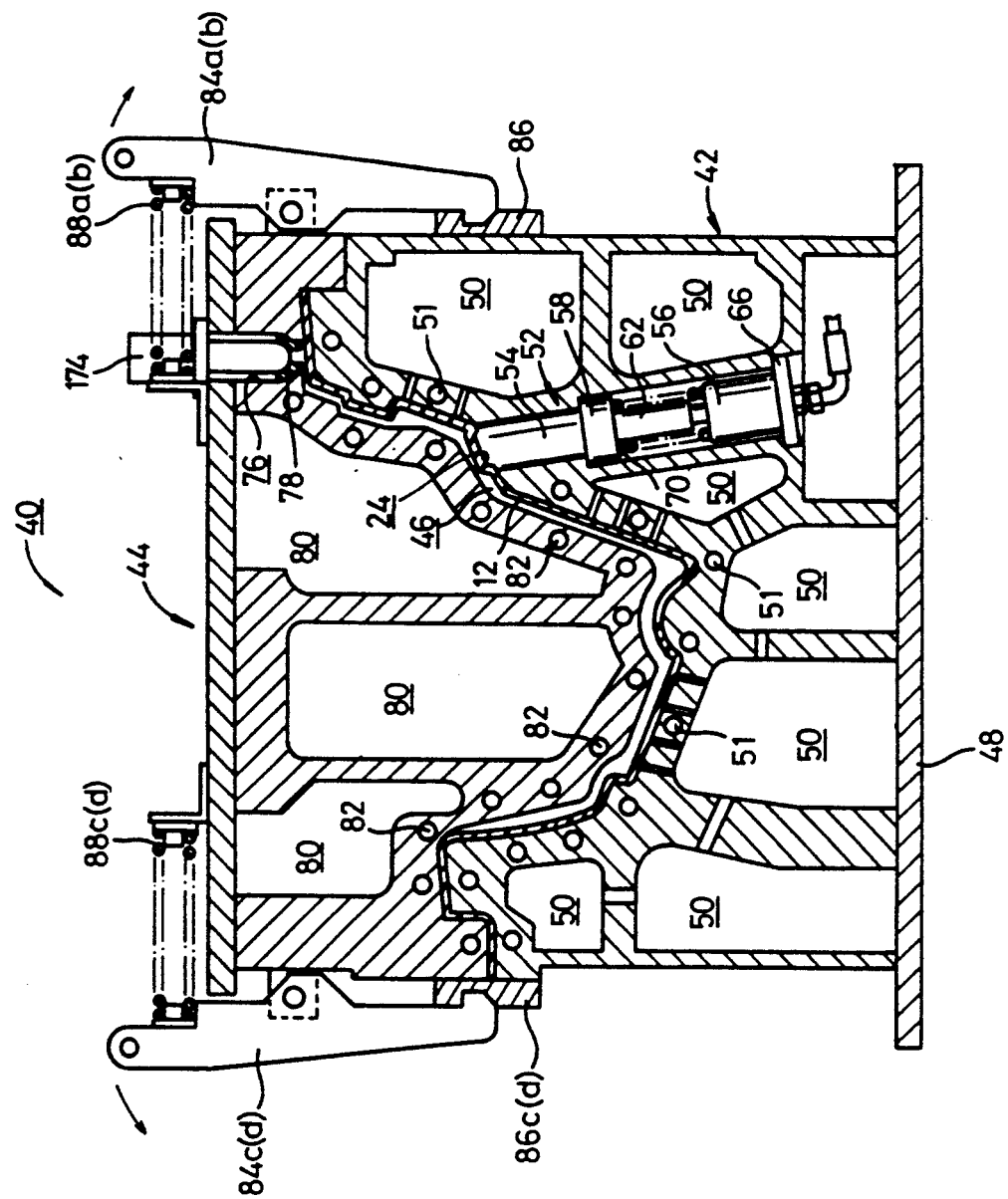
FIG. 4 is a vertical cross-sectional view of a mold assembly of the synthetic resin molding apparatus.

As shown in FIG. 4, each of the mold assemblies 40 comprises a first mold die (female mold die) 42 having a concave mating surface or product forming surface, and a second mold die (male mold die) 44 having a convex mating surface or product forming surface, the second mold die 44 being fittable in the first mold die 42. The product forming surfaces of the first and second mold dies 42, 44 jointly define a mold cavity 46 which is complementary in shape to the instrument panel 10 in the illustrated embodiment.

The first mold die 42 is fixedly mounted on a die base 48. The first mold die 42 has a plurality of voids or cavities 50 defined therein and communicating with each other through vent holes, thus making up an evacuating circuit.

The product forming surface of the first mold die 42 is preferably made of a porous electroformed body having a countless number of minute holes or interstices. These minute interstices of the product forming surface serve as suction holes communicating with the cavities 50 for attracting the covering sheet 12 to the product forming surface of the first mold die 42 under a vacuum developed in the cavities 50. The porous electroformed body may be made by depositing an electrically conductive layer on the surface of a mold die pattern model, holding a layer of particles against the surface of the electrically conductive layer, then electrodepositing a metal layer by an electroforming process thereby to form an electroformed shell, and extracting the particles from the electroformed shell. For further details, reference should be made to Japanese Laid-Open Patent Publication No. 61(1986)-163290. Instead of employing the porous electroformed body, the mold cavity 46 and the cavities 50 may be held in communication with each other by suction holes as shown in FIG. 4. The first mold die 42 also has temperature regulating pipes 51 for circulating cooling water therethrough to regulate the temperature of the first mold die 42.

The first mold die 42 also has a number of slide cores 52 (one shown) for adding an undercut configuration to a product molded by the mold assembly 40. The slide core 52 is shown in detail in FIG. 5.

Figure 5:
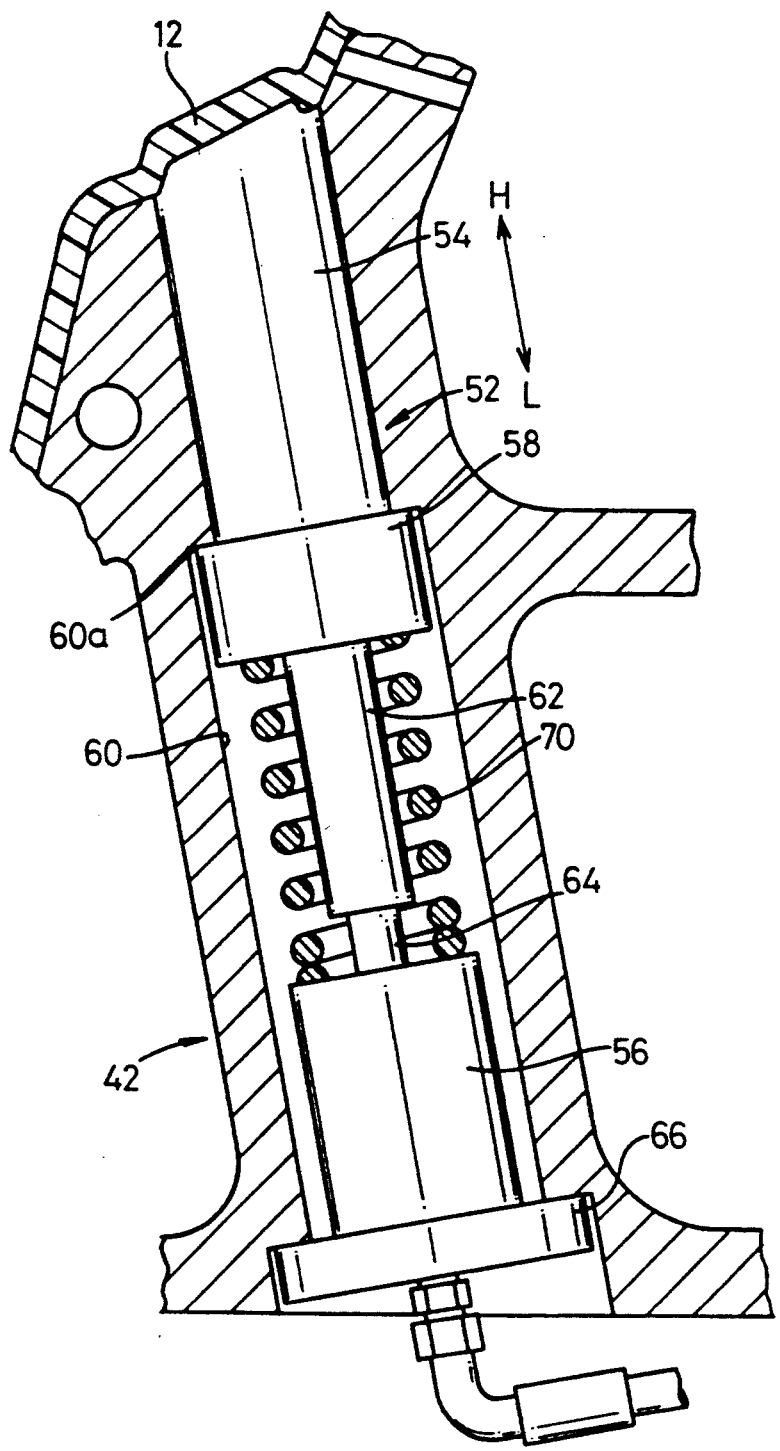
FIG. 5 is an enlarged fragmentary cross-sectional view showing a slide core of the mod assembly.

As shown in FIG. 5, each of the slide cores 52 comprises a core member 54 and a cylinder 56 serving as an actuator for moving the core member 54 back and forth. The core member 54 has a stop 58 on its lower or inner end for positioning the upper or outer end of the core member 54 when it projects into the mold cavity 46. The stop 58 is engageable with a step 60a in a hole 60 which is defined in the first mold die 42 and receives the slide core 52. To the stop 58, there is joined a stem 62 coupled to a piston rod 64 of the cylinder 56. The cylinder 56 has on its lower end a flange 66 by which the cylinder 56 is fixed to the first mold die 42 by bolts (not shown) threaded through the flange 66.

The core member 54 is normally urged resiliently in the direction indicated by the arrow H, i.e., toward the mold cavity 46, by a coil spring 70 disposed around the stem 62 between the core member 54 and the cylinder 56, so that the stop 58 is engaged by the step 60a at all times. The core member 54 can be retracted in the direction indicated by the arrow L by actuating the cylinder 56.

On a side wall of the first mold die 42, there is mounted a joint connector (not shown) connected to a hydraulic hose from a hydraulic power unit for supplying working oil to the cylinder 56 of each of the slide cores 52. The joint connector has a quick-connect-and-disconnect fitting of the self-sealing type.

The second mold die 44 comprises a vertically movable die mold connected to a lifting/lowering means (described later on). The second mold die 44 has a hole 76 defined in one end thereof and receiving a sprue 78 in which a head for pouring a solution of a resin foam or cellular plastic will be fitted. The second mold die 44 has a plurality of voids or cavities 80 defined therein so that the second mold die 44 is reduced in weight, and temperature-regulating pipes 82 are provided for circulating cooling water therethrough.

Swingable lock arms 84a through 84d serving as mold clamping mechanisms are mounted on opposite side walls of the second mold die 44. The lock arms 84a through 84d have hooked lower distal ends engageable with engaging members 86a through 86d, respectively, fixed to the first mold die 42. The lock arms 84a through 84d are normally urged to swing in the directions indicated by the arrows by coil springs 88a through 88d mounted on the upper wall of the second mold die 44, thus holding the hooked ends of the lock arms 84a through 84d in engagement with the engaging members 86a through 86d.

Figure 6:
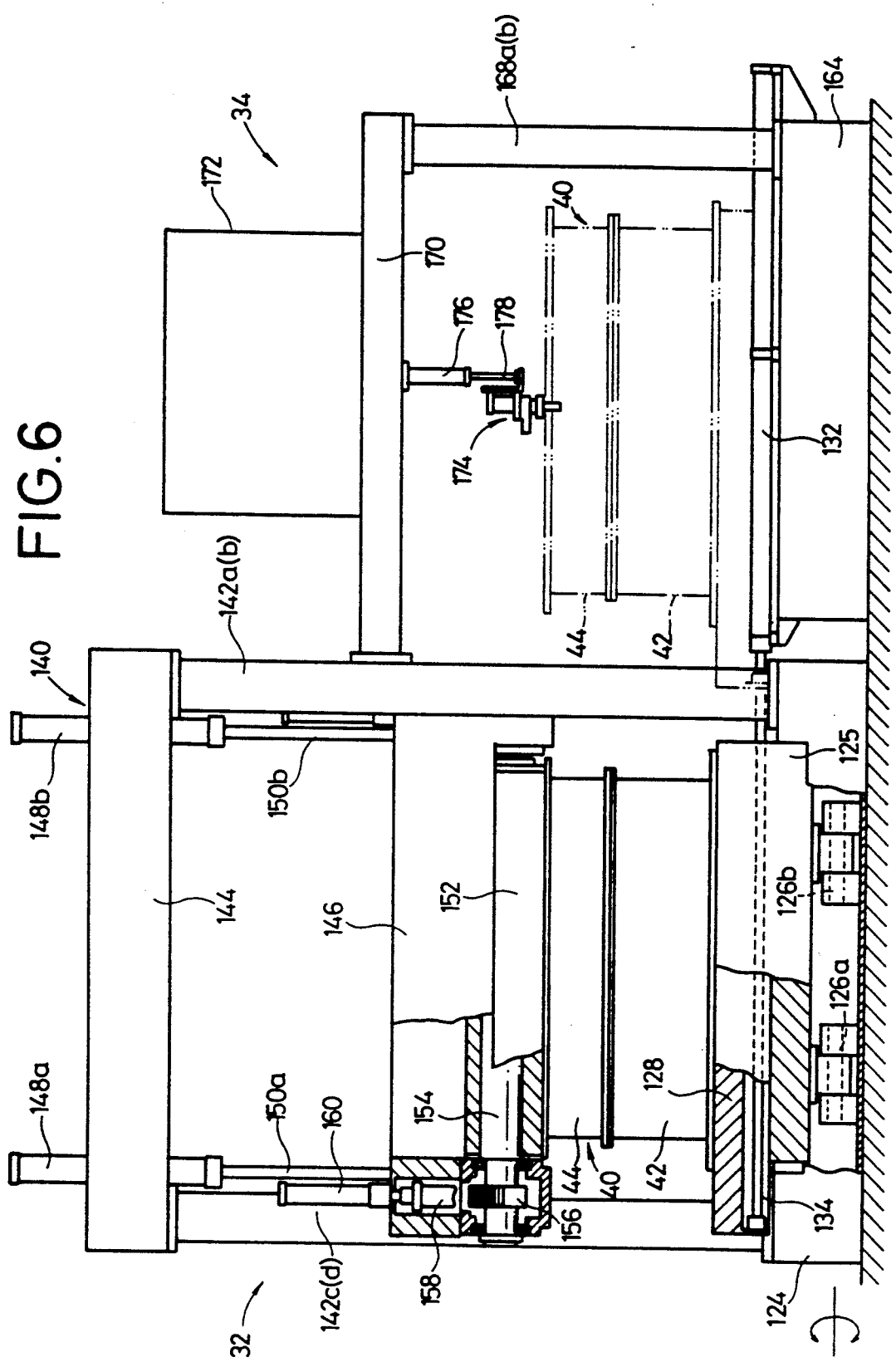
FIG. 6 is a side elevational view, partly broken away, of the first and second stations of the synthetic resin molding apparatus.
Figure 8:
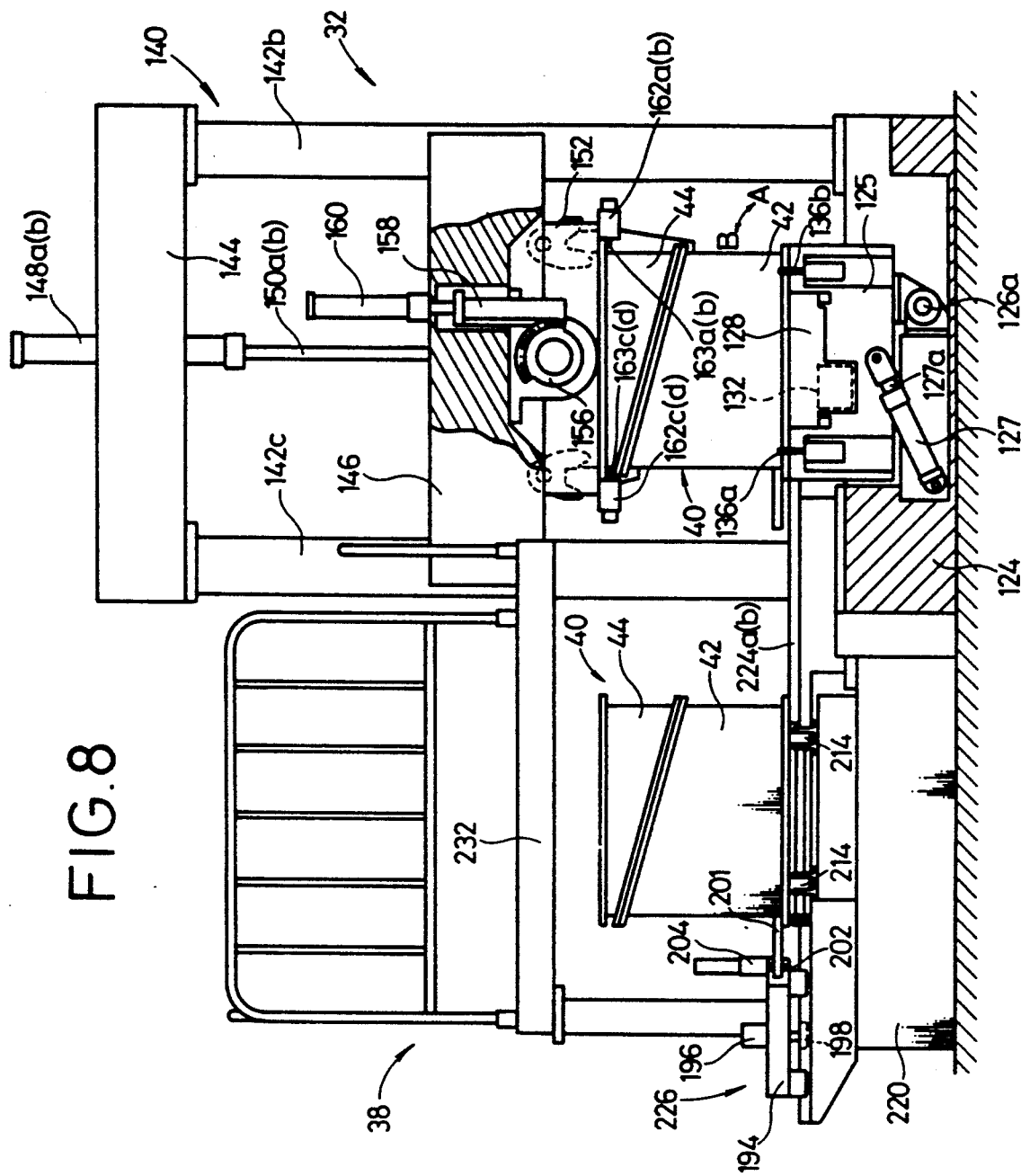
FIG. 8 is a side elevational view, partly broken away, of the first and fourth stations of the synthetic resin molding apparatus, the view showing closed mold assemblies.

As shown in FIGS. 3 and 6, the first station 32 includes a base 124 in which a tilt table 125 is supported for tilting movement as indicated by the arrows A, B. The tilt table 125 is tiltably supported by a pair of shafts 126a, 126b (FIG. 6). As shown in FIG. 8, a piston rod 127a of a tilt cylinder 127 is coupled to the tilt table 125. The tilt table 125 can be tilted 45° by extending the piston rod 127a of the tilt cylinder 127 (see FIG. 9).

One of the mold dies 40 is mounted on the tilt table 125 by a carriage 128 of the feed mechanism 41. The first and second stations 32, 34 are interconnected by a feed table 129 on which rails 130a, 130b extending from the first station 32 to the second station 34 are mounted. The carriage 128 is movable on and along the rails 130a, 130b. A cylinder 132 having a stroke length corresponding to the distance traversed by the carriage 128 is disposed in the second station 34 and has a piston rod 134 coupled to one end of the carriage 128. Locator pins 136a, 136b for fitting in holes defined in the bottom of the mold assembly 40 to position the same are mounted in the tilt table 125 at ends thereof, the locator pins 136a, 136b being movable upwardly from the upper surface of the tilt table 125. As indicated by the broken lines in FIG. 9, the locator pins 136a, 136b are moved by respective cylinders associated therewith. Similar locator pins 138a, 138b are also disposed in the carriage 128.

FIGS. 6 and 8 show a press mechanism 140 disposed in the first station 32, for closing and opening the mold assembly 40 on the carriage 128. The press mechanism 140 comprises a fixed plate mounted on the upper ends of support columns 142a through 142d vertically mounted on the base 124, and a vertically movable ram 146 disposed below the fixed plate 144. The fixed plate 144 supports hydraulic cylinders 148a, 148b for vertically moving the ram 146, and the cylinders have respective piston rods 150a, 150b coupled to the ram 146. The ram 146 has a holder frame 152 for holding the second mold die 44 of the mold assembly 40 and vertically displacing the second mold die 44 in unison with the ram 146.

The holder frame 152 is rotatably supported by a support shaft 154. A pinion gear 156 is mounted on one end of the support shaft 154 and held in mesh with a rack 158 connected to the piston rod of a cylinder 160 mounted on the ram 146. When the cylinder 160 is operated, the rack 158 is vertically linearly moved to rotate the pinion gear 156 for angularly moving the holder frame 152 through 120° in the direction indicated by the arrow C (FIG. 9) which is opposite to the direction in which the tilt table 125 is tilted in the direction indicated by the arrow A. As shown in FIG. 8, a clamp means for clamping the second mod die 44 to the holder frame 152 comprises a plurality of clamps 162a through 162d mounted on the lower end of the holder frame 152. The clamps 162a through 162d are actuatable by respective cylinders to displace respective dogs 163a through 163d thereof into and out of engagement with a flange on the upper end of the second mold die 44.

Figure 7:
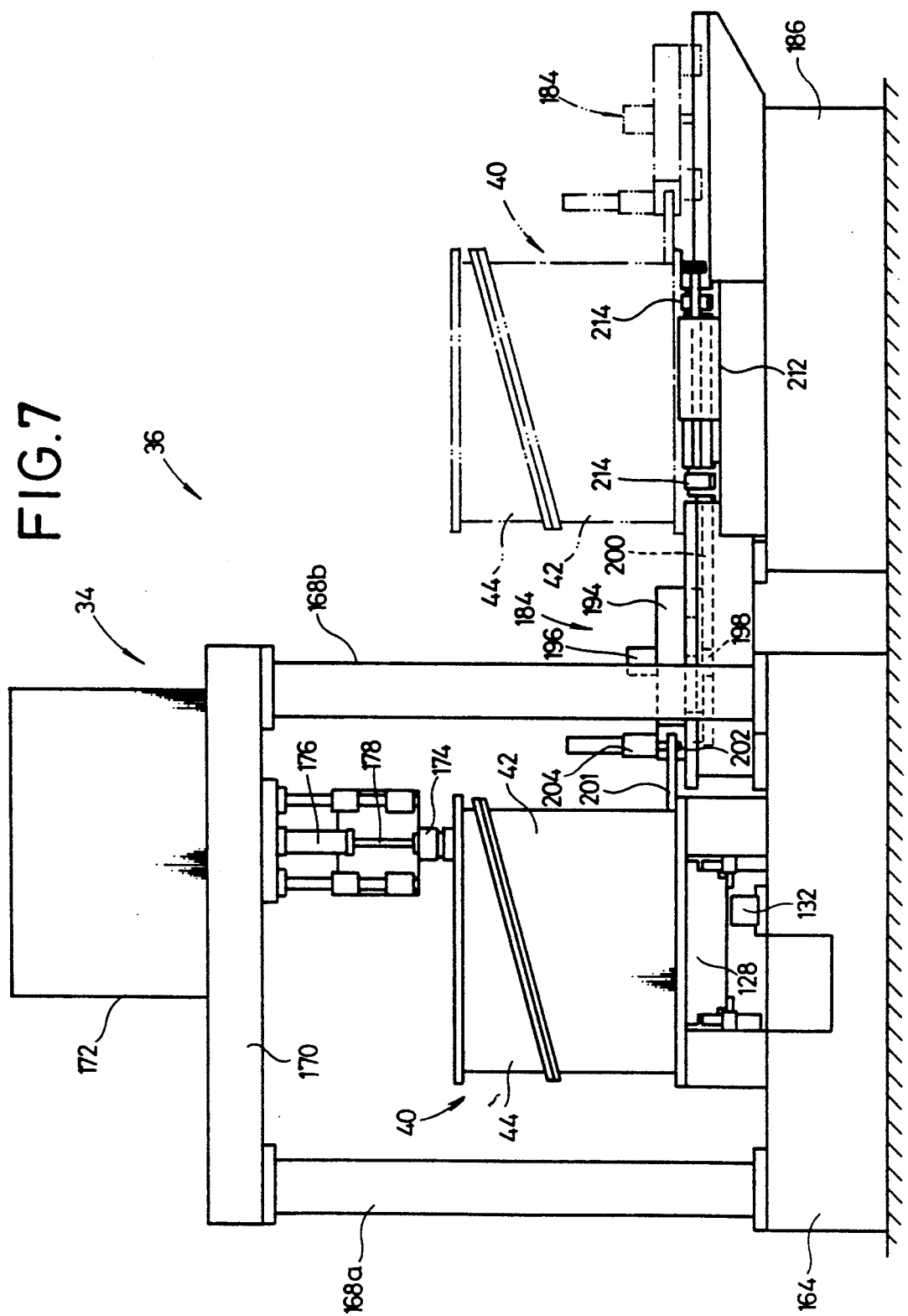
FIG. 7 is a side elevational view of the second and third stations of the synthetic resin molding apparatus.

As illustrated in FIG. 3, locator pins 166a, 166b for engaging the carriage 128 to position the same are mounted on the upper surface of the base 164 of the second station 34. As shown in FIGS. 6 and 7, columns 168a, 168b are vertically mounted on the base 164 and support thereon an attachment table 170 on which there is installed a pump unit 172 for pouring a resin solution into the mold assembly 40. The pump unit 172 has a pouring head 174 connected to the distal end of a piston rod 178 of a cylinder 176 fixed to the attachment table 170.

In FIG. 3, the third station 36 and the fourth station 38 carry out substantially the same step of hardening a resin foam solution poured into the mold assemblies 40. Since the hardening step takes a longer time than the steps effected in the first and second stations 32, 34, the hardening step is carried out in the two stations, i.e., the third and fourth stations 36, 38, and the two mold assemblies 40 are always positioned respectively in these stations 36, 38.

Between the third station 36 and the second station 34, the mold assembly 40 is movably placed on rails 182a, 182b laid on a feed table 180. The feed mechanism 41 also includes a self-propelled tractor carriage 184 movable between the third station 36 and the second station 34. More specifically, guide rails 188a, 188b for guiding the tractor carriage 184 thereon are mounted on a base 186 of the third station 36 and the feed table 180. The tractor carriage 184 has a carriage body 194 supporting a motor 196 as a drive source, the motor 196 having a rotatable output shaft on which there is mounted a pinion 198 (FIG. 7) meshing with a rack 200 parallel to the guide rails 188a, 188b. The carriage body 194 also has a coupling mechanism for coupling the tractor carriage 184 to the mold assembly 40. The coupling mechanism includes an engaging plate 201 fixed to a lower portion of the first mold die 42, and a cylinder 204 mounted on the carriage body 194 for moving a pin 202 into and out of engagement with the engaging plate 201.

The feed mechanism 41 further includes a roller conveyor 210 for feeding the mold assembly 40 between the third and fourth stations 36, 38. The roller conveyor 210 includes a plurality of feed rollers 214 spaced at intervals and operatively interconnected by a chain 216 which is movable by a motor 212 disposed in the third station 36 at one end thereof.

The fourth station 38 is similar in construction to the third station 34. The fourth station 38 includes a base 220 connected to the base 124 of the first station 32 by a feed table 222 on which rails 224, 224b are mounted. The mold assembly 40 is movable from the fourth station 38 to the first station 32 along the rails 224a, 224b. In the fourth station 38, the feed mechanism 41 includes a self-propelled tractor carriage 226 for hauling the mold assembly 40, the tractor carriage 226 being movable on and along guide rails 228a, 228b placed on the base 220 and the feed table 222. The tractor carriage 226 can be moved by a motor-driven pinion meshing with a rack 230 extending parallel to the guide rails 228a, 228b. The tractor carriage 226 is structurally identical to the tractor carriage 184 in the third station 36. Therefore, those parts of the tractor carriage 226 which are identical to those of the tractor carriage 183 are denoted by identical reference numerals, and will not be described in detail.

As shown in FIG. 8, an operator deck 232 for the operator to stand on is disposed directly above the fourth station 38.

The synthetic resin molding apparatus is basically constructed as described above. Operation and advantages of the synthetic resin molding apparatus will be described below.

The molding process of the synthetic resin molding apparatus will be described in respect to the steps carried out on a single mold assembly 40 in the first, second, third, and fourth stations 32, 34, 36, 38, respectively.

Figure 9:
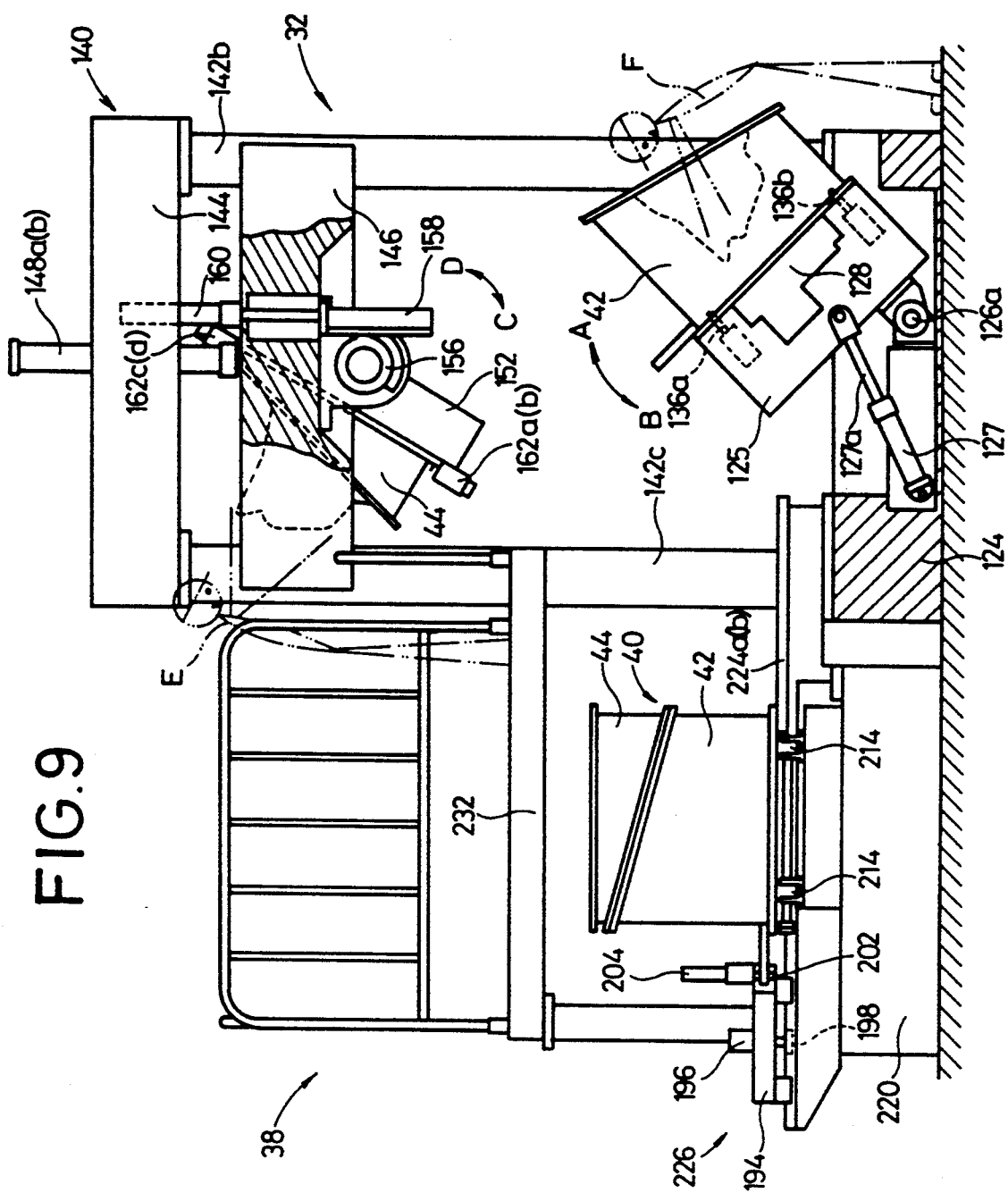
FIG. 9 is a view similar to FIG. 8, showing the condition in which one of the mold assemblies is opened.

As shown in FIG. 9, before the process of molding the instrument panel 10 is started, the first mold die 42 on the tilt table 124 is tilted 45° to the horizontal plane in the first station 32, and the second mold die 44 is tilted in the opposite direction to the tit table 124. Operators E, F are assigned respectively to the second mold die 44 and the first mold die 42. The operator E sets various components of the instrument panel 10 on the product forming surface of the second mold die 44, whereas the operator F places the covering sheet 12 of synthetic leather analogous to real leather on the product forming surface of the first mold die 42.

In this embodiment, those components of the instrument panel 10 which are set by the operator E include attachments for meters and ducts for providing housing boxes. The instrument panel 10 includes a core material of a urethane foam.

In the first station 32, the first and second mold dies 42, 44 are tilted for the operators F, E to set the components efficiently with a comfortable posture. Since the first and second mold dies 42, 44 are tilted in the opposite directions to each other, they can be attended by the respective operators F, E. Therefore, the time required to effect the preparatory operation in the first station 32 is shortened.

As shown in FIGS. 4 and 5, the core member 54 of each side core 52 in the first mold die 42 of the mold assembly 40 in the first station 32 is urged toward the mold cavity 46 under the bias of the coil spring 70, with the stop 58 engaging the step 60a. Therefore, the distal end of the core member 54 projects into the mold cavity 46. The cover sheet 12 is placed on the product forming surface of the first mold die 42, and the cavities 50 in the first mold die 42 are evacuated to attract the cover sheet 12 into close contact with the first mold die 42, with undercuts 24 formed in the cover sheet 12 by the core members 54.

Thereafter, the piston rod 127a of the cylinder 127 is retracted to turn the tilt table 125 in the direction indicated by the arrow B until the first mold die 42 lies horizontally. The rack 158 coupled to the cylinder 160 is lifted by the cylinder 160 to turn the second mold die 44 held by the holder frame 152 through 120° in the direction indicated by the arrow D until the second mold die 44 assumes a horizontal position.

Then, the ram 146 is lowered to bring the second mold die 44 into mating engagement with the first mold die 42 by extending the piston rods 150a, 150b of the cylinders 148a, 148b. As a result, the mold assembly is closed as shown in FIG. 8. Then the dogs 163a through 163d of the clamps 162a through 162d are released from the flange of the second mold die 44, thereby disconnecting the second mold die 44 from the holder frame 152. The locator pins 136a, 136b are pulled out of the bottom of the first mold die 42, and the locator pins 138a, 138b on the carriage 128 engage into the bottom of the first mold die 42. The carriage 128 now can feed the mold assembly 40 out of the first station 32.

The carriage 128 is then transferred from the first station 32 into the second station 34. More specifically, as shown in FIGS. 3 and 6, the piston rod 134 of the cylinder 132 in the second station 34 is retracted into the cylinder 132 to cause the carriage 128 coupled to the piston rod 134 and carrying the mold assembly 40 to move along the rails 130a, 130b to the second station 34. The mold assembly 40 then stops in the second station 34, after which the locator pins 166a, 166b on the base 164 latch the bottom of the first mold die 42 thereby to position the mold assembly 40.

Then, the pump unit 172 shown in FIG. 6 is operated to pour a solution of a resin foam or cellular plastic such as a hard urethane foam into the mold assembly 40. More specifically, the pouring head 174 is lowered into the sprue 78 of the second mold die 44 by the cylinder 176, after which the resin foam solution is poured into the mold cavity 46 defined in the mold assembly 40. The resin solution is mixed in the mold cavity 46 and foamed, thus developing a gas pressure in the mold cavity 46. However, since the core members 54 of the slide cores 52 in the first mold die 42 are resiliently biased by the coil springs 70, the core members 54 are resistant to the gas pressure and stay firmly positioned against accidental displacement.

After the resin foam solution has been poured, the piston rod 178 of the cylinder 176 is retracted upwardly to elevate the pouring head 174. Then, the mold assembly 40 is moved from the second station 34 to the third station 36. At this time, the tractor carriage 184 of the feed mechanism 41 feeds the mold assembly 40 to the third station 36 as follows: First, the locator pins 166a, 166b disengage from the bottom of the first mold die 42 in the second station 34, thereby releasing the mold assembly 40 into readiness for movement. Then, as shown in FIG. 7, the motor 196 is energized to rotate the pinion 198 in mesh with the rack 200 for thereby moving the tractor carriage 128 from the two-dot-and-dash-line position to the solid-line position. After the tractor carriage 184 has stopped in the solid-line position, the cylinder 204 is operated to cause the pin 202 to engage the engaging plate 201 on the mold assembly 40. The motor 196 is then reversed to move back the tractor carriage 184 for pulling the mold assembly 40 to the third station 36. Thereafter, the resin foam solution is hardened in the mold assembly 40 in the third station 36. After the mold station 40 has moved to the third station 36, the carriage 128 is moved back to the first station 32 by the cylinder 132.

The roller conveyor 210 is actuated to deliver the mold assembly 40 from the third station 36 to the fourth station 38. More specifically, the motor 212 of the roller conveyor 210 is energized to rotate the feed rollers 214 through the chain 216 for thus moving the mold assembly 40 on the feed rollers 214 toward the fourth station 38. The resin foam solution in the mold assembly 40 is also hardened in the fourth station 38.

The tractor carriage 226 for feeding the mold assembly 40 from the fourth station 38 to the first station 32 operates in exactly the same manner as the tractor carriage 184. Therefore, the operation of the tractor carriage 226 will not be described in detail. With the resin foam solution hardened in the third and fourth stations 36, 38, the mold assembly 40 returns to the first station 32, in which the mold assembly 40 is opened and the molded instrument panel 10 is taken out of the mold assembly 40.

More specifically, when the mold assembly 40 arrives at the first station 32, the locator pins 136a, 136b of the tilt table 125 latch the bottom of the first mold die 42. As a consequence, the mold assembly 40 is positioned with respect to the tilt table 125, and will be prevented from being displaced when the tilt table 125 is subsequently tilted. In order to operate the slide cores 52 in the first mold die 42, the hydraulic hose from the non-illustrated hydraulic power unit is joined to the joint connector (not shown) on the side panel of the mold assembly 40. Then, the cylinders 56 of the slide cores 52 are supplied with working from the hydraulic power unit to retract the core members 54 in the direction indicated by the arrow L in FIG. 5.

The ram 146 is lowered by the hydraulic cylinders 148a, 148b of the press mechanism 140 until the holder frame 152 engages the second mold die 44. The dogs 163a through 163d of the clamps 162a through 162d are moved into engagement with the flange of the second mold die 44. After the holder frame 152 and the second mold die 44 have been connected to each other, the hydraulic cylinders 148a, 148b are actuated to lift the ram 146. As shown in FIG. 9, the cylinder 160 is operated to lower the rack 158 to rotate the pinion gear 156 to turn the second mold die 44 about the support shaft 154 through 120° in the direction indicated by the arrow C.

At the same time, the piston rod 127a of the cylinder 127 is extended to tilt the tilt table 125 and hence the first mold die 42 about the support shafts 126a, 126b through 45° in the direction indicated by the arrow A that is opposite to the direction in which the second mold die 44 is tilted.

After the first and second mold dies 42, 44 are tilted away from each other, the operators F, E effect various operations associated with the removal of the molded instrument panel 10. Since the core members 54 are retracted from the product molding surface of the first mold die 42, the instrument panel 10 can easily be removed.

Instrument panels 10 are successively molded while the three mold assemblies 40 are being successively circulated through the first, second, third, and fourth stations 32, 34, 36, 38. When the mold assemblies 40 are moved, the hydraulic hose from the hydraulic power unit is disconnected from the joint connector. Therefore, the hydraulic hose does not present any obstacle to the movement of the mold assemblies 40, and the hydraulic drive system combined with the hydraulic power unit can be maintained and serviced with ease.

In actual operation, the three mold assemblies 40 in the synthetic resin molding apparatus 30 are positioned respectively in the first station 32, the third station 36, and the fourth station 38. The molding steps are successively carried out while moving the mold assemblies 30 successively through the stations. More specifically, the mold assembly 40 which is closed in the first station 32 is fed to the second station 34 by the carriage 128, and supplied with a resin foam solution in the second station 34. Since the first station 32 is emptied by the departure of the mold assembly 40, the mold assembly 40 which has been in the fourth station 38 is delivered to the first station 32 by the tractor carriage 226. The mold assembly 40 which has stayed in the third station 36 is fed to the emptied fourth station 38 by the roller conveyor 210. After the resin foam solution has been poured into the mold assembly 40 in the second station 34, the mold assembly 40 is moved from the second station 34 to the third station 36 by the tractor assembly 184. Accordingly, the molding process is efficiently carried without producing an undesirable idle time with respect to the three mold assemblies 40.

Figure 10:
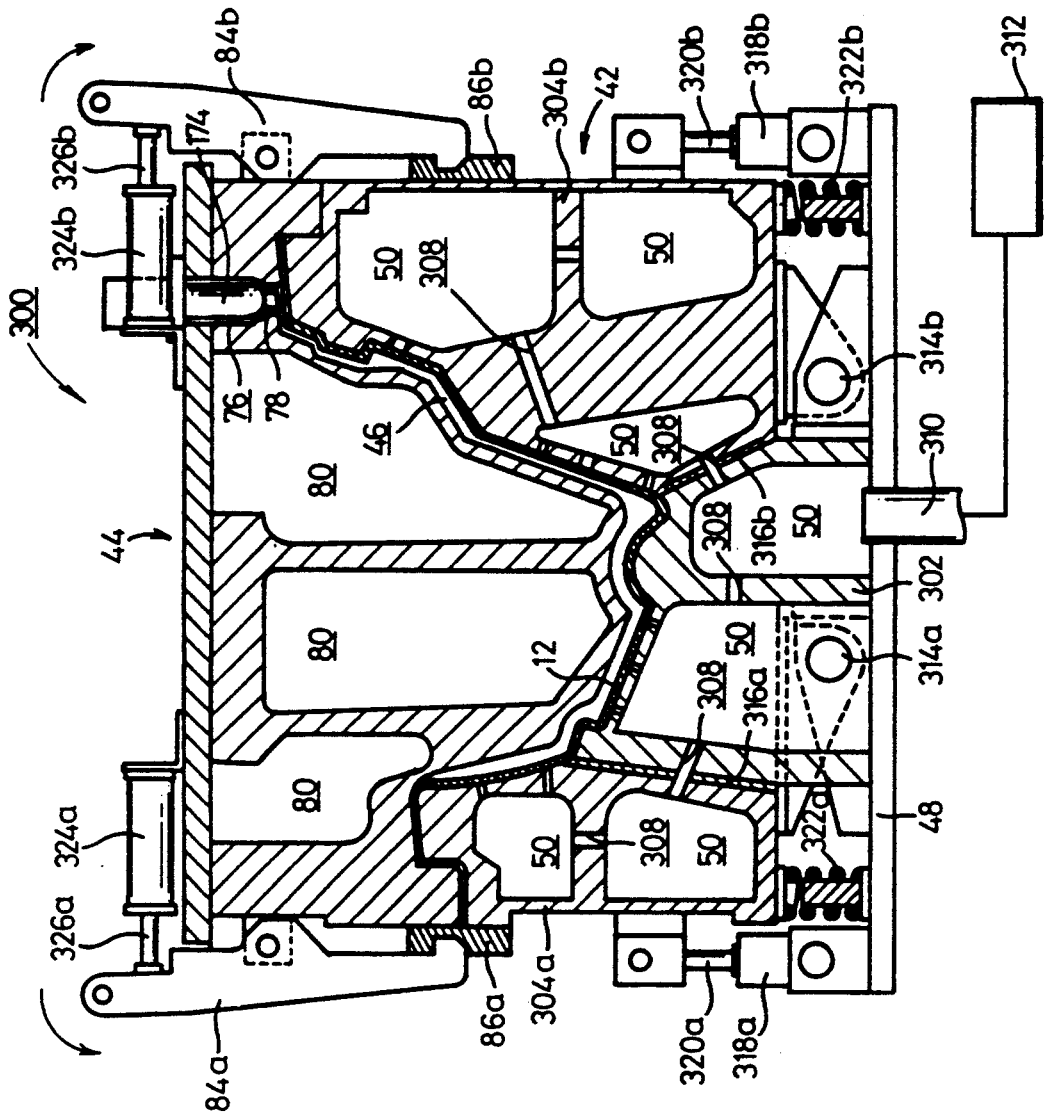
FIG. 10 is a vertical cross-sectional view of a mold assembly according to another embodiment of the present invention.

FIGS. 10 and 11 show a mold assembly 300 according to another embodiment of the present invention. Those components of the mold assembly 300 which are identical to those of the mold assembly 40 shown in FIG. 4 are designated by identical reference numerals, and will not be described in detail.

A first mold die 42 is composed of separate members for facilitating the removal of a molded product. More specifically, the first mold die 42 comprises a fixed member 302, two movable members 304a, 304b disposed forwardly and rearwardly of the fixed member 302 in the transverse direction indicated by the arrow X (FIG. 11), and two movable members 306a, 306b disposed laterally of the fixed member 302 in the longitudinal direction indicated by the arrow Y. The fixed member 302 is securely mounted on the die plate 48, and has cavities 50 communicating with each other through vent holes 308. One of the cavities 50 communicates with a pipe 310 extending from a vacuum pump 312.

The movable members 304a, 304b and the movable members 306a, 306b are similarly constructed except that they are positioned differently with respect to the fixed member 302. For the sake of brevity, therefore, only the movable members 304a, 304b will be described, and those parts of the movable members 306a, 306b which are identical to those of the movable members 304a, 304b are denoted at identical reference numerals and will not be described in detail.

The movable members 304a, 304b are swingably supported by respective support shafts 314a, 314b. Packings 316a, 316b are interposed between confronting surfaces of the movable members 304a, 304b and the fixed member 302 for keeping the cavities 50 therein airtight. Therefore, an evacuating circuit is defined in the fixed member 302 and the movable members 304a, 304b through the vent holes 308, rather than pipes or tubes.

Mechanisms for moving the movable members 304a, 304b away from the fixed member 302 are disposed laterally of the movable members 304a, 304b. More specifically, cylinders 318a, 318b swingably mounted on the die plate 48 have respective piston rods 320a, 320b coupled by pins to outer sides of the movable members 304a, 304b. As shown in FIG. 11, the paired movable members 304a, 304b are movable away from the fixed member 302 in the direction indicated by the arrow B1, and the paired movable members 306a, 306b are movable away from the fixed member 302 in the direction indicated by the arrow B2, which is normal to the direction indicated by the arrow B1. The movable members 304a, 304b and the movable members 306a, 306b are normally urged resiliently to move toward the fixed member 302 in the directions indicated by the arrows A1, A2 by springs 322a, 322b, so that the first mold die 42 is normally put together. In the illustrated embodiment, the movable members 304a, 304b are separably disposed transversely one on each side of the fixed member 302. However, the fixed member 302 and the movable member 304a may be combined into a fixed member, and only the movable member 304b may be movable with respect to the fixed member. Such a modification may also be possible with respect to the longitudinally separable movable members 306a, 306b.

Mold clamp cylinders 324a, 324b are disposed on the upper panel of the upper mold die 44 and have piston rods 326a, 326b, respectively, which are coupled to the respective lock arms 84a, 84b.

The mold assembly 300 thus constructed operates as follows: In the following description about the operation of the mold assembly 300, emphasis is placed on those actions which are different from those of the mold assembly 40 according to the preceding embodiment.

The movable members 304a, 304b and the movable members 306a, 306b are resiliently urged against the fixed member 302 under the resiliency of the springs 322a, 322b. The covering sheet 12 is placed in the first mold die 42 thus put together, and then attracted under vacuum to the first mold die by the vacuum pump 312.

Then, the second mold die 44 is lowered into the first mold die 42, and they are firmly clamped together by the lock arms 84a, 84b operated by the mold clamp cylinders 324a, 324b.

The mold cavity 46 is filled with a resin foam solution. After the poured resin foam solution has been hardened, the mold assembly 300 is opened, and the molded instrument panel 10 is taken out. At this time, the cylinders 318a, 318b are operated to retract the piston rods 320a, 320b to turn the movable members 304a, 304b and the movable members 306a, 306b about the support shafts 314a, 314b away from the fixed member 302 in the mutually perpendicular directions indicated by the arrows B1, B2 against the bias of the springs 322a, 322b. As a result, the molded instrument panel 10 can easily be removed from the first mold die 42.

With the present invention, as described above, the process of molding a product of synthetic resin is composed of three steps which are effected in respective stations. More specifically, necessary components are set in the mold assembly, the mold assembly is closed, and a molded product is removed from the mold assembly in the first station. A resin foam solution is poured into the mold assembly in the second station. The poured resin foam solution is hardened in the third station. Since these steps are effected in the at least three stations, the cycle time can be reduced by circulating at least three mold assemblies successively through the stations. Inasmuch as the time required to harden the resin foam solution is long, the third station is followed by a fourth station, and the molded product is hardened in the third and fourth stations, so that the entire process can be carried out efficiently.

In the first station, the first and second mold dies of each mold assembly are tilted away from each other. Accordingly, the necessary components can be set in the first and second mold dies and the molded product can be removed by the operators attending the first and second mold dies, respectively. These operations and others can be performed by the operators at a comfortable posture. Consequently, the operators can do required work with ease and highly efficiently.

Moreover, the core member of each slide core is resiliently urged toward the mold cavity by the spring. When the mold assembly is moved, the hydraulic hose for supplying the cylinder which displaces the core member is disconnected from the mold assembly, and the core member is prevented from being positionally displaced. Therefore, the mold assembly can be moved efficiently, and the molded product is prevented from becoming defective due to displacement of the core member. In addition, the hydraulic drive system for supplying working oil to the slide core can easily maintained and serviced.

In another embodiment of the present invention, the first mold die of each mold assembly is composed of separable members, i.e., a fixed member and movable members which are normally urged resiliently against the fixed member. This provides a fail-safe function such that when the second mold die is fitted into the first mold die, the first mold die is always put together by the resiliently biased movable members held against the fixed member. Even if any of the mold clamp cylinders or other parts fails, the mold dies as they are brought together are protected from damage or breakage. The movable members are separable away from the fixed member in longitudinal and transverse directions of the fixed member. Since the movable members are moved away from the fixed member in such mutually perpendicular directions, the molded product can easily be removed. The cavities in the fixed and movable members of the first mold die are held in communication with each other, making up an evacuating circuit for attracting the cover sheet against the product forming surface of the first mold die under vacuum. The evacuating circuit thus constructed simplifies the evacuating system, and is free from a failure such as a vacuum loss which would otherwise result from the breakage of a pipe. As a consequence, the synthetic resin molding apparatus can perform the molding operation efficiently.

Although certain preferred embodiments have been shown and described, it should be understood that many changes and modifications may be made therein without departing from the scope of the appended claims.

What is claimed is:

1. An apparatus for molding a product of synthetic resin, comprising:

a mold assembly having a die plate, first and second mold dies which define a mold cavity therebetween, and said first mold die being mounted on said die plate, said first mold die comprising a fixed member fixed to said die plate, at least two movable members which are respectively displaceable in substantially perpendicular directions away from each other, each of said movable members being mounted on said die plate and further being displaceable away from said fixed member to open said first mold die, and a resilient member for substantially perpendicularly contacting said movable members and urging said movable members toward said fixed member to assemble said first mold die together wherein said fixed member of the first mold die has a product forming surface facing said mold cavity and composed of at least one of porous material and suction holes, said fixed member having a vacuum chamber defined therein, said movable member having a vacuum member defined therein and communicating with said vacuum chamber in said fixed chamber through a vent hole, further including a vacuum pump communicating with said vacuum chamber in said fixed member, whereby said vacuum pump and said vacuum chamber in said fixed and movable members jointly provide an evacuating circuit for evacuating said mold cavity.

2. An apparatus according to claim 1, wherein said first mold die includes a seal member interposed between confronting surfaces of said fixed and movable members, both said fixed member and said movable member having a plurality of vacuum chambers therein, said vacuum chambers communicating with each other through vent holes.

3. An apparatus according to claim 1, wherein said movable members are swingably mounted on said die plate.

* * * * *